(12) United States Patent
Kim et al.

(10) Patent No.: US 9,021,871 B2
(45) Date of Patent: May 5, 2015

(54) FUEL AMOUNT DETECTION DEVICE FOR VEHICLE

(71) Applicant: Coavis, Yeongi-gun (KR)

(72) Inventors: KyungHwan Kim, Yeongi-gun (KR); Jeongsik Kim, Daejeon (KR)

(73) Assignee: Coavis (KR)

( * ) Notice: Subject to any disclaimer, the term of this patent is extended or adjusted under 35 U.S.C. 154(b) by 55 days.

(21) Appl. No.: 14/087,538

(22) Filed: Nov. 22, 2013

(65) Prior Publication Data
US 2014/0076046 A1 Mar. 20, 2014

Related U.S. Application Data

(63) Continuation-in-part of application No. 13/166,300, filed on Jun. 22, 2011, now abandoned.

(30) Foreign Application Priority Data

Jun. 23, 2010 (KR) .................. 10-2010-0059496

(51) Int. Cl.
| | | |
|---|---|---|
| G01F 23/00 | (2006.01) | |
| G01F 23/76 | (2006.01) | |
| F02M 37/00 | (2006.01) | |
| G01F 23/36 | (2006.01) | |

(52) U.S. Cl.
CPC ........... *G01F 23/76* (2013.01); *F02M 37/0082* (2013.01); *G01F 23/36* (2013.01); *G01F 23/363* (2013.01)

(58) Field of Classification Search
CPC ...................................... G01F 23/00

USPC ............... 73/114.38, 114.54, 290 R
See application file for complete search history.

(56) References Cited

U.S. PATENT DOCUMENTS

| | | | | |
|---|---|---|---|---|
| 6,021,668 A | * | 2/2000 | Sawert et al. ............ | 73/313 |
| 6,127,916 A | * | 10/2000 | Cooper et al. ............ | 338/190 |
| 6,209,392 B1 | | 4/2001 | Rapala | |

(Continued)

FOREIGN PATENT DOCUMENTS

| | | |
|---|---|---|
| JP | 2004-333486 | 11/2004 |
| KR | 1020040026490 | 3/2004 |
| KR | 1020100039921 | 4/2010 |

OTHER PUBLICATIONS

Korean Notice of Allowance—Korean Application No. 10-2010-0059496 issued on Sep. 10, 2012, citing JP2004333486, US6209392, KR1020100039921 and KR1020040026490.

(Continued)

*Primary Examiner* — Eric S McCall
(74) *Attorney, Agent, or Firm* — Cantor Colburn LLP

(57) ABSTRACT

Provided is a fuel amount detection device for a vehicle positioned in a fuel tank of the vehicle to detect a remaining fuel amount. In the fuel amount detection device for a vehicle, a resistor pattern and a conductive pattern formed on a resistor substrate and spaced apart from each other are electrically connected to each other by a conductive material coated on a conductive film pressed by a contactor to prevent abrasion of the resistor pattern formed on the resistor substrate, thereby making it possible to improve durability. In addition, since the resistor pattern is sealed by the conductive film, it does not contact fuel, such that corrosion of the resistor pattern is prevented, thereby making it possible to accurately detect a fuel amount.

6 Claims, 6 Drawing Sheets

(56) References Cited

U.S. PATENT DOCUMENTS

| | | | |
|---|---|---|---|
| 6,212,950 B1 | 4/2001 | Cooper et al. | |
| 2005/0115312 A1 | 6/2005 | Curello et al. | |
| 2008/0053219 A1* | 3/2008 | Ireland et al. | 73/313 |

OTHER PUBLICATIONS

Korean Office Action—Korean Application No. 10-2010-0059496 issued on Feb. 24, 2012, citing JP 2004-333486.

* cited by examiner

FUEL AMOUNT DETECTION DEVICE FOR VEHICLE

CROSS-REFERENCE TO RELATED APPLICATIONS

This application is a continuation-in-part-application of U.S. Ser. No. 13/166,300, filed on Jun. 22, 2011, which claims priority to and the benefit of Korean Patent Application No. 10-2010-0059496, filed on Jun. 23, 2010, in the Korean Intellectual Property Office, the disclosure of which is incorporated herein by reference in its entirety.

TECHNICAL FIELD

The following disclosure relates to a fuel amount detection device for a vehicle positioned in a fuel tank of the vehicle to detect a remaining fuel amount.

BACKGROUND

It is very important to accurately detect a remaining fuel amount of a vehicle in order to efficiently drive the vehicle and secure security.

A fuel amount detection device for detecting a remaining amount of fuel stored in a fuel tank is used in the vehicle.

The fuel amount detection device according to the related art is divided into a mechanical fuel amount detection device and an electronic fuel amount detection device.

The mechanical fuel amount detection device is configured to include a base body 1, a resistor substrate 2, a retainer 3, a contactor 4 (also referred to as a 'wiper'), and a shaft 5. In the mechanical fuel amount detection device, the retainer 3 is coupled to a floater, the contactor 4 is coupled to the retainer 3, and a height of the floater changes depending on a change in a fuel amount, such that the contactor 4 rotates in the state in which it contacts the resistor substrate 2. Therefore, the mechanical fuel amount detection device detects a fuel amount by detecting a resistance value changed depending to a rotation angle of the contactor 4.

In addition, the electronic fuel amount detection device detects a fuel amount using a sensor.

The mechanical fuel amount detection device has been mainly used as compared with the electronic fuel amount detection device.

However, in the case of the mechanical fuel amount detection device according to the related art, since the contactor and the resistor substrate are in direct contact with each other and are always in contact with each other, they are rapidly worn out, and the resistor substrate is rapidly corroded due to a contact between the resistor substrate and fuel, or the like.

Since these problems deteriorate durability of the fuel amount detection device and allows a remaining fuel amount not to be accurately detected, reliability of fuel amount detection has been deteriorated in a fuel amount detection device used for a long period of time.

SUMMARY

An embodiment of the present invention is directed to providing a fuel amount detection device for a vehicle capable of having improved durability by preventing abrasion of a resistor pattern formed on a resistor substrate and capable of accurately detecting a fuel amount by preventing the resistor pattern from contacting fuel to prevent corrosion of the resistor pattern.

In one general aspect, a fuel amount detection device for a vehicle includes: a base body; a resistor substrate coupled to the base body and having a resistor pattern and a conductive pattern formed on an upper surface thereof and spaced apart from each other; a conductive film disposed over the resistor substrate so as to be spaced apart from the resistor substrate and having a conductive material coated on a lower surface thereof; a contactor disposed over the conductive film; and a retainer having one side coupled to the base body by a shaft and the other side coupled to the contactor, wherein the contactor is closely adhered downward by the retainer and only a portion of the conductive film pressed by the contactor is closely adhered to the resistor substrate, such that the resistor pattern and the conductive pattern are electrically connected by the conductive material.

A fixing frame may be coupled to an edge of the conductive film and be closely adhered to the upper surface of the resistor substrate, such that the resistor pattern and the conductive pattern formed on the upper surface of the resistor substrate are sealed by the conductive film.

The conductive material coated on the conductive film may include silver (Ag) or palladium (Pd).

The fuel amount detection device for a vehicle may further include an elastic body pushing the contactor toward the conductive film to allow the contactor to be closely adhered to the conductive film.

DETAILED DESCRIPTION OF MAIN ELEMENTS

| | |
|---|---|
| 10: base body | |
| 11: through-hole | 12: sealing member |
| 20: resistor substrate | |
| 21: resistor pattern | 22: conductive pattern |
| 23: connection pattern | |
| 30: retainer | |
| 31: through-hole | 32: sliding groove |
| 40: contactor | |
| 50: conductive film | 51: conductive material |
| 52: fixing frame | 53: sealing member |
| 60: elastic body | |
| 70: shaft | |

DETAILED DESCRIPTION OF EMBODIMENTS

Hereinafter, a technical idea of the present invention will be described in more detail with reference to the accompanying drawings.

Figure 1:
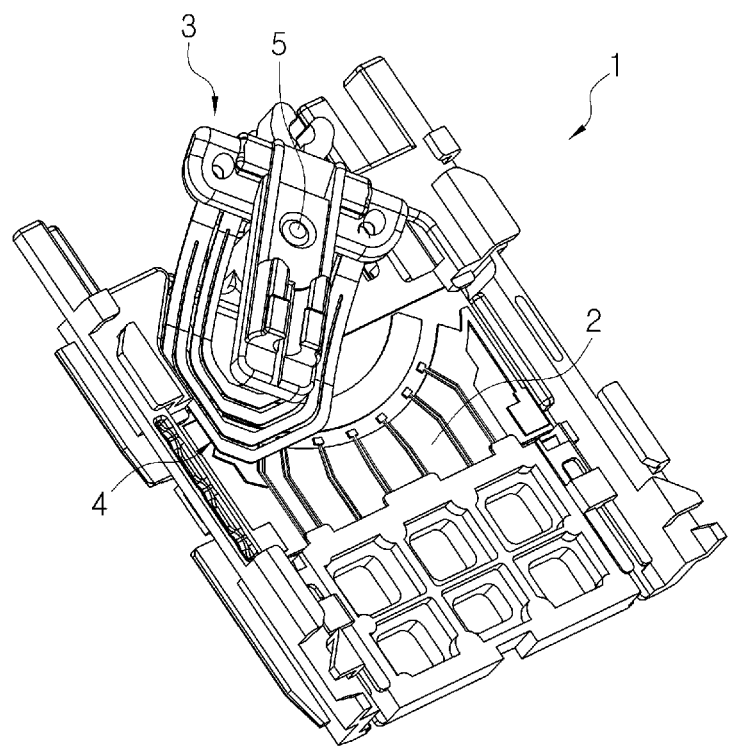
FIG. 1 is a schematic view showing an assembled state of a mechanical fuel amount detection device for a vehicle according to the related art.
Figure 2:
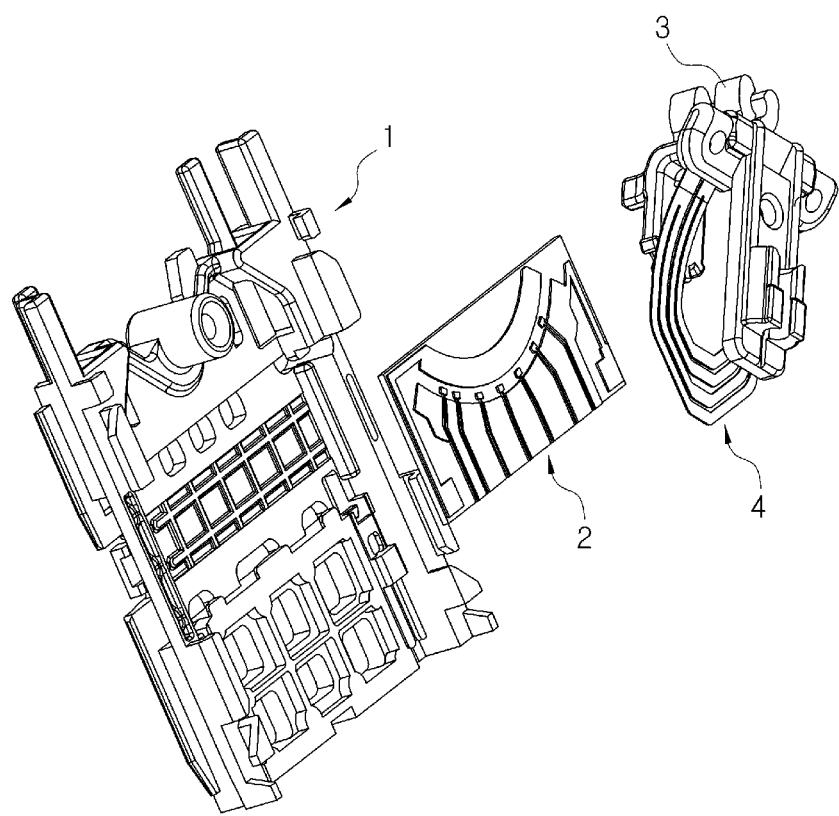
FIG. 2 is an exploded perspective view of the fuel amount detection device for a vehicle shown in FIG. 1.
Figure 3:
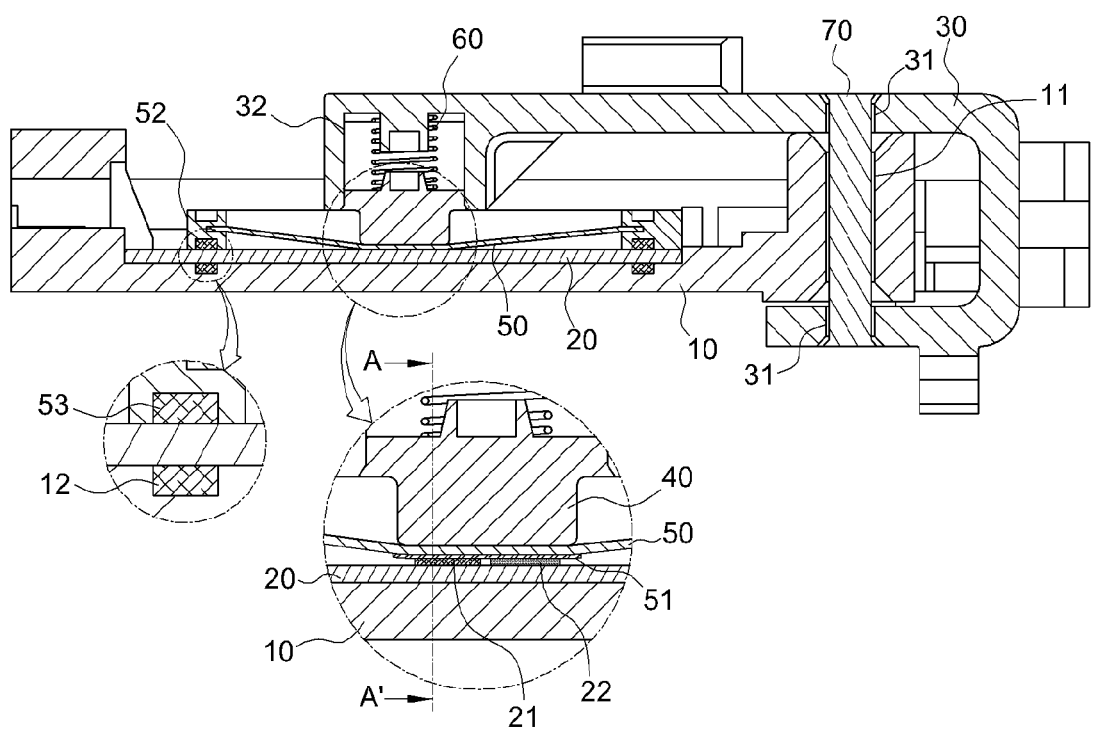
FIG. 3 is a schematic cross-sectional view of a fuel amount detection device for a vehicle according to an exemplary embodiment of the present invention.
Figure 4:
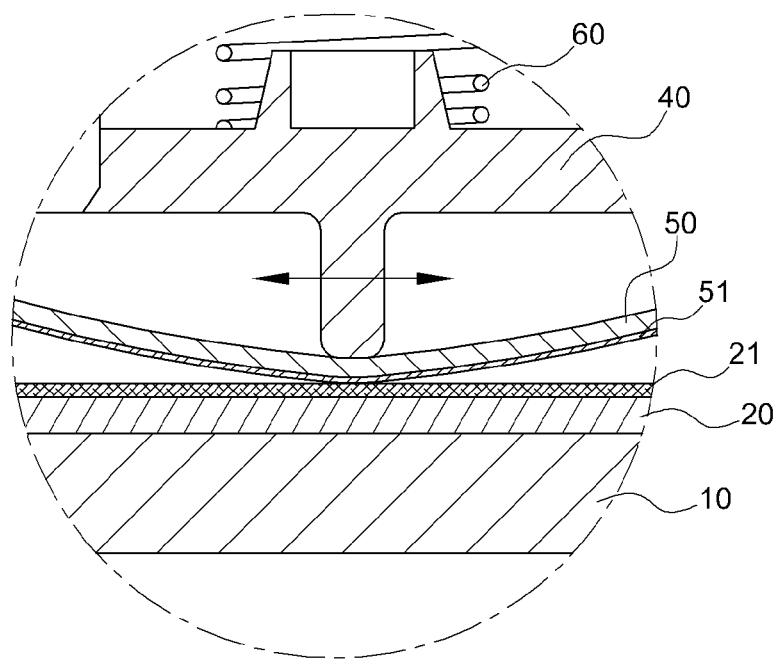
FIG. 4 is a cross-sectional view taken along the line A-A of FIG. 3.
Figure 5:
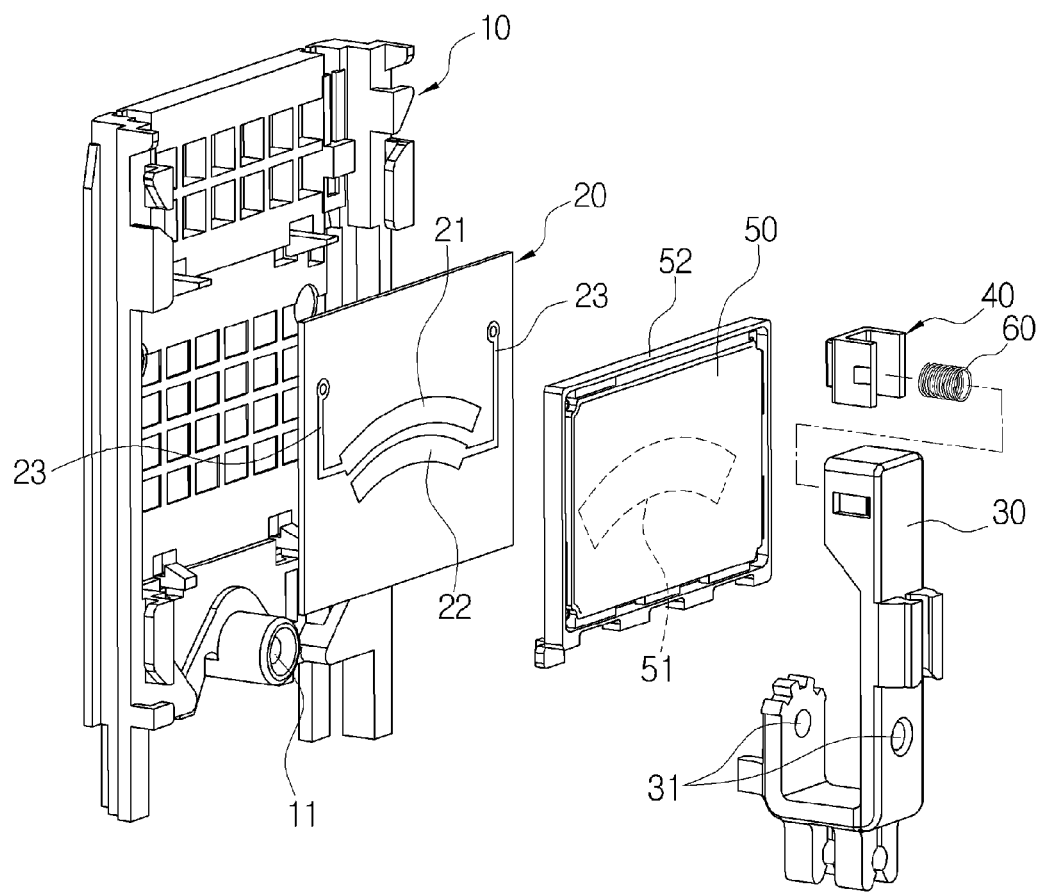
FIG. 5 is an exploded perspective view of the fuel amount detection device for a vehicle according to the exemplary embodiment of the present invention.
Figure 6:
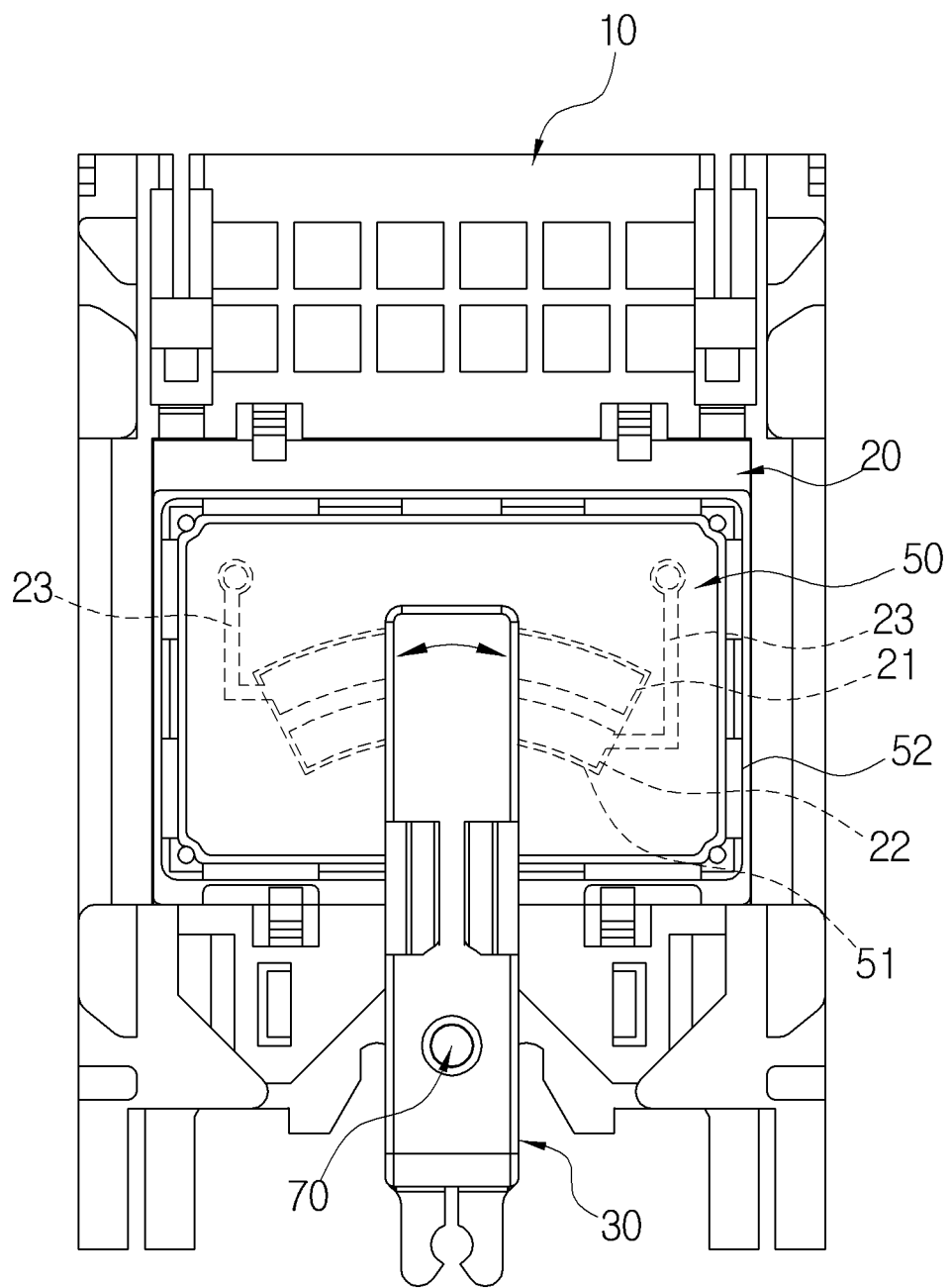
FIG. 6 is a plan view showing an assembled state of the fuel amount detection device for a vehicle according to the exemplary embodiment of the present invention.

The present invention relates to a fuel amount detection device for a vehicle. More specifically, as shown in FIGS. 3 to 6, the fuel amount detection device for a vehicle is configured to include a base body 10; a resistor substrate 20 coupled to the base body 10 and having a resistor pattern 21 and a conductive pattern 22 formed on an upper surface thereof and spaced apart from each other; a conductive film 50 disposed over the resistor substrate 20 so as to be spaced apart from the resistor substrate 20 and having a conductive material 51 coated on a lower surface thereof; a contactor 40 disposed over the conductive film 50; and a retainer 30 having one side coupled to the base body 10 by a shaft 70 and the other side coupled to the contactor 40, wherein the contactor 40 is closely adhered downward by the retainer 30 and only a portion of the conductive film 50 pressed by the contactor 40 is closely adhered to the resistor substrate 20, such that the resistor pattern 21 and the conductive pattern 22 are electrically connected by the conductive material 51.

First, the base body 10 includes a seating groove formed in a shape in which an upper portion thereof is concave so that the resistor substrate 20 may be seated thereon and be coupled thereto. In addition, the base body 10 includes a through-hole 11 formed therein so that the retainer 30 may be coupled thereto by the shaft 70.

The resistor substrate 20 is coupled to the concave seating groove of the base body 10. In addition, the resistor substrate 20 has the resistor pattern 21 and the conductive pattern 22 formed on the upper surface thereof, wherein the resistor pattern 21 and the conductive pattern 22 are spaced apart from each other, such that they are not electrically connected to each other. Here, the resistor pattern 21 and the conductive pattern 22 may be lengthily formed in an arc shape, the resistor pattern 21 is formed so that a resistance value thereof changes depending on a length thereof, and the conductive pattern 22 is made of a conductive material so that electricity may be conducted and is formed so that a resistance value thereof does not substantially change depending on a length thereof. In addition, the resistor pattern 21 may have a connection pattern 23 extended from one end thereof so that an electric wire may be connected thereto, and the conductive pattern 22 may also have a connection pattern 23 extended from the other end thereof so that an electric wire may be connected thereto.

Further, the conductive film 50 is disposed over the resistor substrate 20 so as to be spaced apart from the resistor substrate 20 by a predetermined distance. Here, an edge of the conductive film 50 is coupled to a fixing frame 52, which is coupled to the base body 10, such that the conductive film 50 may be fixed so as to be spaced apart from the resistor substrate 20 over the resistor substrate 20. Here, the conductive film 50 may have the conductive material 51 coated on the lower surface thereof, wherein the conductive material 51 may be formed in an arc shape at a position corresponding to those of the resistor pattern 21 and the conductive pattern 22 so as to cover the entire resistor pattern 21 and conductive pattern 22.

The contactor 40 is disposed over the conductive film 50, such that a protruding lower portion of the contactor 40 is closely adhered to an upper surface of the conductive film 50. In addition, the retainer 30 has one side coupled to the base body 10 by the shaft 70 and the other side coupled to the contactor 40. Here, the base body 10 and the retainer 30 have through-holes 11 and 31 formed therein, respectively, and are coupled to each other by inserting the shaft 70 into the through-holes 11 and 31, such that the retainer 30 may be rotated in an arc shape around the shaft 70.

Therefore, the contactor 40 is pressed downward by the retainer 30, such that it is closely adhered to the conductive film 50, and the conductive film 50 is closely adhered to the resistor pattern 21 and the conductive pattern 22. That is, the conductive material 51 coated on the lower surface of the conductive film 50 is closed adhered to the resistor pattern 21 and the conductive pattern 22. Therefore, the resistor pattern 21 and the conductive pattern 22 are electrically connected to each other by the conductive material 51.

Here, the contactor 40 is closely adhered downward by the retainer 30, and only a portion of the conductive film 50 pressed by the contactor 40 is closely adhered to the resistor substrate 30, such that only portions of the resistor pattern 21 and the conductive pattern 22 are electrically connected to each other by the conductive material 51.

Here, the resistor pattern 21 and the conductive pattern 22 are electrically connected to each other by the conductive material 51 coated on the lower surface of the conductive film 50 at a portion pressed by the contactor 40 when the retainer 30 is rotated in the arc shape around the shaft 70, such that a resistance value may be detected from the connection pattern 23 of one end of the resistor pattern 21 through the conductive material 51 and the connection pattern 23 of the other end of the conductive pattern 22. That is, since positions of the resistor pattern 21 and the conductive pattern 22 electrically connected to each other by the conductive material 51 are changed as the retainer 30 is rotated by a change in a remaining fuel amount in a fuel tank of the vehicle, a resistance value changed depending on the change in the positions of the resistor pattern 21 and the conductive pattern 22 is detected, thereby making it possible to accurately detect a fuel amount.

Therefore, in the fuel amount detection device for a vehicle according to the exemplary embodiment of the present invention positioned in the fuel tank of the vehicle to detect a remaining fuel amount, the resistor pattern and the conductive pattern formed on the resistor substrate and spaced apart from each other are electrically connected to each other by the conductive material coated on the conductive film pressed by the contactor, such that the contactor moving depending on a change in a fuel amount does not directly contact the resistor pattern. Therefore, abrasion of the resistor pattern formed on the resistor substrate is prevented, thereby making it possible to improve durability and accurately detect a fuel amount.

In addition, the fixing frame 52 is coupled to the edge of the conductive film 50 and is closely adhered to the upper surface of the resistor substrate 20, such that the resistor pattern 21 and the conductive pattern 22 formed on the upper surface of the resistor substrate 20 may be sealed by the conductive film 50.

That is, the edge of the conductive film 50 is coupled and fixed to the fixing frame 52 and a lower surface of the fixing frame 52 is closely adhered to the upper surface of the resistor substrate 20, such that the resistor pattern 21 and the conductive pattern 22 formed on the upper surface of the resistor substrate 20 may be sealed by the conductive film 50 and the resistor substrate 20. Therefore, the resistor pattern 21 and the conductive pattern 22 may not contact the fuel. Here, the fixing frame 52 has a sealing member 53 formed on a lower surface thereof, such that the fixing frame 52 and the resistor substrate 20 may be closely adhered to each other and be sealed by the sealing member 53.

Therefore, the resistor pattern does not contact the fuel, such that corrosion of the resistor pattern is prevented, thereby making it possible to improve durability and accurately detect a fuel amount.

Here, a sealing member 12 is also interposed between the lower surface of the resistor substrate 20 and an upper surface of the base body 10 to which the lower surface of the resistor substrate 10 is closely adhered, such that a lower portion of the resistor substrate 20 may also be sealed.

In addition, as the conductive material 51 coated on the conductive film, silver (Ag), copper (Cu), palladium (Pd), or the like, is used. It is preferable that silver (Ag) or palladium (Pd) having excellent electric conductivity is used.

It is preferable that the fuel amount detection device for a vehicle according to the exemplary embodiment of the present invention further includes an elastic body 60 pushing the contactor 40 toward the conductive film 50 to allow the contactor 40 to be closely adhered to the conductive film 50.

Here, the elastic body 60 needs to push the contactor 40 so that the contactor 40 may rotate horizontally while being maintained in the state in which it is closely adhered to the conductive film 50 and needs to allow a detected resistance value to be accurate. That is, the contactor 40 needs to be closely adhered to the conductive film 50 by the elastic body 60 at an appropriate pressure.

In addition, the retainer 30 is provided with a sliding groove 32 into which the contactor 40 is inserted, and the elastic body 60 is provided in the sliding groove 32, such that an upper end of the elastic body 60 may be closely adhered to the retainer 30 and a lower end thereof may be closely adhered to the contactor 40. That is, the contactor 40 may be movable vertically along the sliding groove 32 in the state in which it is pressed in a downward direction by the elastic body 60.

In the fuel amount detection device for a vehicle according to the exemplary embodiment of the present invention positioned in the fuel tank of the vehicle to detect a remaining fuel amount, the resistor pattern and the conductive pattern formed on the resistor substrate and spaced apart from each other are electrically connected to each other by the conductive material coated on the conductive film pressed by the contactor to prevent abrasion of the resistor pattern formed on the resistor substrate, thereby making it possible to improve durability. In addition, since the resistor pattern is sealed by the conductive film, it does not contact the fuel, such that corrosion of the resistor pattern is prevented, thereby making it possible to accurately detect a fuel amount.

The present invention is not limited to the above-mentioned exemplary embodiments but may be variously applied, and may be variously modified by those skilled in the art to which the present invention pertains without departing from the gist of the present invention claimed in the claims.

What is claimed is:

1. A fuel amount detection device for a vehicle comprising:
    a base body;
    a resistor substrate coupled to the base body and having a resistor pattern and a conductive pattern formed on an upper surface thereof and spaced apart from each other;
    a conductive film disposed over the resistor substrate so as to be spaced apart from the resistor substrate and having a conductive material coated on a lower surface thereof;
    a contactor disposed over the conductive film; and
    a retainer having one side coupled to the base body by a shaft and the other side coupled to the contactor,
    wherein the contactor is closely adhered downward by the retainer and only a portion of the conductive film pressed by the contactor is closely adhered to the resistor substrate, such that the resistor pattern and the conductive pattern are electrically connected by the conductive material.

2. The fuel amount detection device for a vehicle of claim 1, wherein the conductive material coated on the conductive film includes silver (Ag) or palladium (Pd).

3. The fuel amount detection device for a vehicle of claim 1, further comprising an elastic body pushing the contactor toward the conductive film to allow the contactor to be closely adhered to the conductive film.

4. The fuel amount detection device for a vehicle of claim 1, wherein a fixing frame is coupled to an edge of the conductive film and is closely adhered to the upper surface of the resistor substrate, such that the resistor pattern and the conductive pattern formed on the upper surface of the resistor substrate are sealed by the conductive film.

5. The fuel amount detection device for a vehicle of claim 4, wherein the conductive material coated on the conductive film includes silver (Ag) or palladium (Pd).

6. The fuel amount detection device for a vehicle of claim 4, further comprising an elastic body pushing the contactor toward the conductive film to allow the contactor to be closely adhered to the conductive film.

\* \* \* \* \*